United States Patent [19]

Bannerot et al.

[11] Patent Number: 5,359,851

[45] Date of Patent: Nov. 1, 1994

[54] VARIABLE GEOMETRY EXHAUST NOZZLE FOR A TURBOJET ENGINE

[75] Inventors: Pierre A. L. M. Bannerot, Melun; Guy J. Lapergue, Rubelles; Eric F. M. Maingre, La Rochette; Xavier J. Pasquali, Le Mee sur Seine; Jean-Claude H. Reghezza, Maincy, all of France

[73] Assignee: Societe Nationale D'Etude et de Construction de Moteurs D'Aviation (S.N.E.C.M.A.), Paris, France

[21] Appl. No.: 155,217

[22] Filed: Nov. 22, 1993

[30] Foreign Application Priority Data

Nov. 25, 1992 [FR] France .................. 92 14165

[51] Int. Cl.⁵ ............................................. F02K 1/12
[52] U.S. Cl. .................. 60/271; 239/265.39; 239/265.41
[58] Field of Search .................. 60/242, 271; 239/265.19, 265.33, 265.39, 265.41, 265.23

[56] References Cited

U.S. PATENT DOCUMENTS 4,000,854  1/1977  Konarski et al. ............... 60/242

FOREIGN PATENT DOCUMENTS 1225736  7/1960  France .
1588791  4/1970  France .
2602274  2/1988  France .
2661716  11/1991  France .
2118249  10/1983  United Kingdom .

Primary Examiner—Richard A. Bertsch
Assistant Examiner—William Wicker
Attorney, Agent, or Firm—Bacon & Thomas

[57] ABSTRACT

A variable geometry nozzle for a turbojet engine is disclosed wherein the adjustment of the cross-sectional area of the nozzle in a converging-diverging configuration is controlled by a single control system. The single control system varies the positions of both of the inner upstream and downstream flaps, as well as the outer flaps. A second control system operates simultaneously with the first control system to change the configuration of the nozzle to a converging-converging configuration. The inner, upstream flaps, which are pivotally connected to the downstream end of the turbojet exhaust duct, are controlled by an axially movable control ring which is connected to the controlled inner, upstream flaps via a link rod. The positions of the inner, downstream flaps, which have their upstream edges pivotally connected to a downstream edge of a corresponding upstream flap, are controlled by the movement of the upstream flap, as well as a connection with a cowling support via another link rod. The positions of the outer flaps are controlled by a cam which is operatively interposed between the control ring and the controlled, outer flaps.

7 Claims, 4 Drawing Sheets

VARIABLE GEOMETRY EXHAUST NOZZLE FOR A TURBOJET ENGINE

BACKGROUND OF THE INVENTION

The present invention relates to a variable geometry exhaust nozzle for a turbojet engine, more particularly such a nozzle in which the nozzle opening in the converging-diverging configuration may be controlled by a single control system.

Variable geometry exhaust nozzles are well-known in the art and typically comprise an annulus of upstream flaps pivotally connected to the exhaust duct of the turbojet engine and an annulus of downstream flaps which are pivotally attached to downstream edges of the upstream flaps. As is known in the art, a control system may be connected to selected ones of the flaps to vary the opening of the exhaust nozzle, as well as its configuration.

Jet aircraft must often carry out missions using both subsonic and supersonic flight. In such cases, the turbojet engines may be equipped with an afterburner system and the variable cross-section nozzle may be moved from a converging-converging configuration for subsonic flight to a converging-diverging configuration for supersonic flight. Moreover, it is often necessary to adjust the minimum nozzle cross-sectional area as a function of the operational state of the engine, particularly a lesser cross-sectional area in normal operation and an enlarged cross-sectional area when using the afterburner.

French patent 1,225,736 illustrate a type of this known nozzle. In this structure, the upstream and downstream flaps use separate controls, each comprising hydraulic actuating cylinders which are connected to the flaps by means of link rods or hinging systems with an annulus of outer flaps being connected to the downstream flaps by link rods. These systems use two separate control loops. While this system achieves independent control of each set of flaps, it results in a structure which is rather complex and fairly heavy.

In the nozzle structure illustrated in French Patent 2,602,274, the downstream flaps are controlled by cylinder rods which are connected by link rods to the outer flaps which, in turn, are connected by link rods to the downstream flaps. In this structure, the relative positions of the three sets of flaps are defined by the lengths of the actuating cylinder rods. Moreover, each control flap of a particular set is connected by two link rods to the outer ring to assure synchronization of operation and to provide a back-up system in the event of failure of one or more of the actuating cylinders. Again, this structure is rather complex and fairly heavy.

SUMMARY OF THE INVENTION

A variable geometry nozzle for a turbojet engine is disclosed wherein the adjustment of the cross-sectional area of the nozzle in a converging-diverging configuration is controlled by a single control system. The single control system varies the positions of both of the inner upstream and downstream flaps, as well as the outer flaps. A second control system operates simultaneously with the first control system to change the configuration of the nozzle to a converging-converging configuration.

The inner, upstream flaps, which are pivotally connected to the downstream end of the turbojet exhaust duct, are controlled by an axially movable control ring which is connected to the controlled inner, upstream flaps via a link rod. The positions of the inner, downstream flaps, which have their upstream edges pivotally connected to a downstream edge of a corresponding upstream flap, are controlled by the movement of the upstream flap, as well as a connection with a cowling support via another link rod. The positions of the outer flaps are controlled by a cam which is operatively interposed between the control ring and the controlled, outer flaps.

During the adjustment of the cross-sectional area while maintaining the nozzle in a converging-diverging configuration, the cowling support is stationary, and the respective flaps are all adjusted by axial movement of the control ring. When it is desired to change the configuration of the nozzle to a converging-converging configuration, the cowling support may also be axially moved simultaneously with the actuating ring. Both the actuating ring and the cowling support are moved in directions generally parallel to a longitudinal axis of the nozzle. The cam means connecting the control ring and the outer flaps is shaped such that in the converging-converging configuration, the outer ring of flaps moves translationally along with the cowling support.

By this invention, the two operational modes of the nozzle can be implemented using a single control loop. In the converging-diverging configuration, only the first control means, the control ring, is actuated. In the converging-diverging configuration, configuration, the first and second control means (the control ring and the cowling support) are simultaneously actuated by the same control members. The control ring and the cowling support allow synchronization in the event of failure of one or more of the control members. The cam interconnecting the control ring and the outer flaps enables the external cone angle of the nozzle to be changed as a function of the angle subtended by the hinged, inner flaps.

The converging-diverging configuration enables a gain in thrust when the afterburner is operative, or when the pressures at the adjustable flaps and outside the nozzle are in a sufficiently high ratio, for instance higher than four. This operating configuration may also be used if the pressure ratio is between one and four, however in this range of pressures, the converging-converging configuration is preferable because of enhanced performance.

In the converging-converging configuration, the variable geometry nozzle is maximally closed and the sets of flaps form two converging cones. This operational configuration is advantageous when the turbojet engine operates between low power and full power without using the afterburner. Thrust or specific fuel consumption is improved relative to a turbojet engine lacking a nozzle adjustable to the converging-diverging configuration.

The cross-sectional area required for a given flow is reduced for the gas flow pressures and temperatures by the present nozzle. This results in two advantages: (1) variations in jet pressure and temperature are attenuated in the zone immediately downstream of the nozzle; and, (2) the nozzle masking of the afterburner system is improved during engine operation. These two advantages significantly reduce the infrared and radar signatures of the turbojet engine equipped with the nozzle according to the present invention.

Using the instant variable geometry nozzle structure, when passing from a maximally closed nozzle to a maximally open nozzle, the sets of flaps form two cones which deform continuously between a converging-converging position for the closed nozzle and a converging-diverging position for the open nozzle. Thus, when the flaps are maximally closed, the outer, cold flaps are retracted and maximally closed, to produce optimal aerodynamic flow around the outer portion of the nozzle. This position also further masks the inner flaps to further reduce the infrared signature of the engine.

The nozzle according to the present invention provides continuous variation of the cross-section between the fully closed and fully opened positions. This allows the easy controlling of the turbojet engine throughout its entire range of operation.

DETAILED DESCRIPTION OF THE PREFERRED EMBODIMENTS

Figure 1:
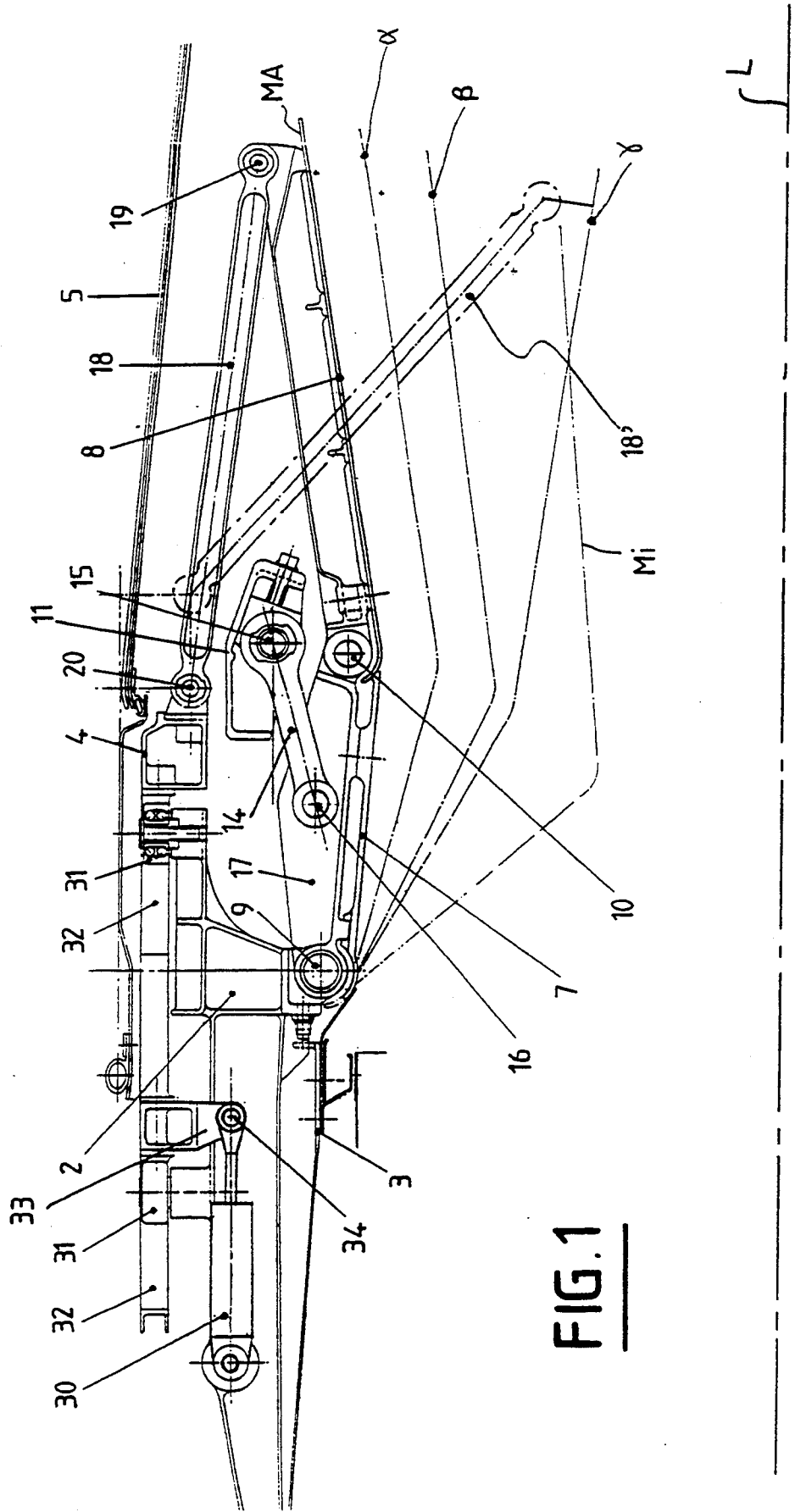
FIG. 1 is a partial, longitudinal, cross-sectional view illustrating the variable geometry nozzle according to the present invention taken in a plane extending along the longitudinal axis.
Figure 2:
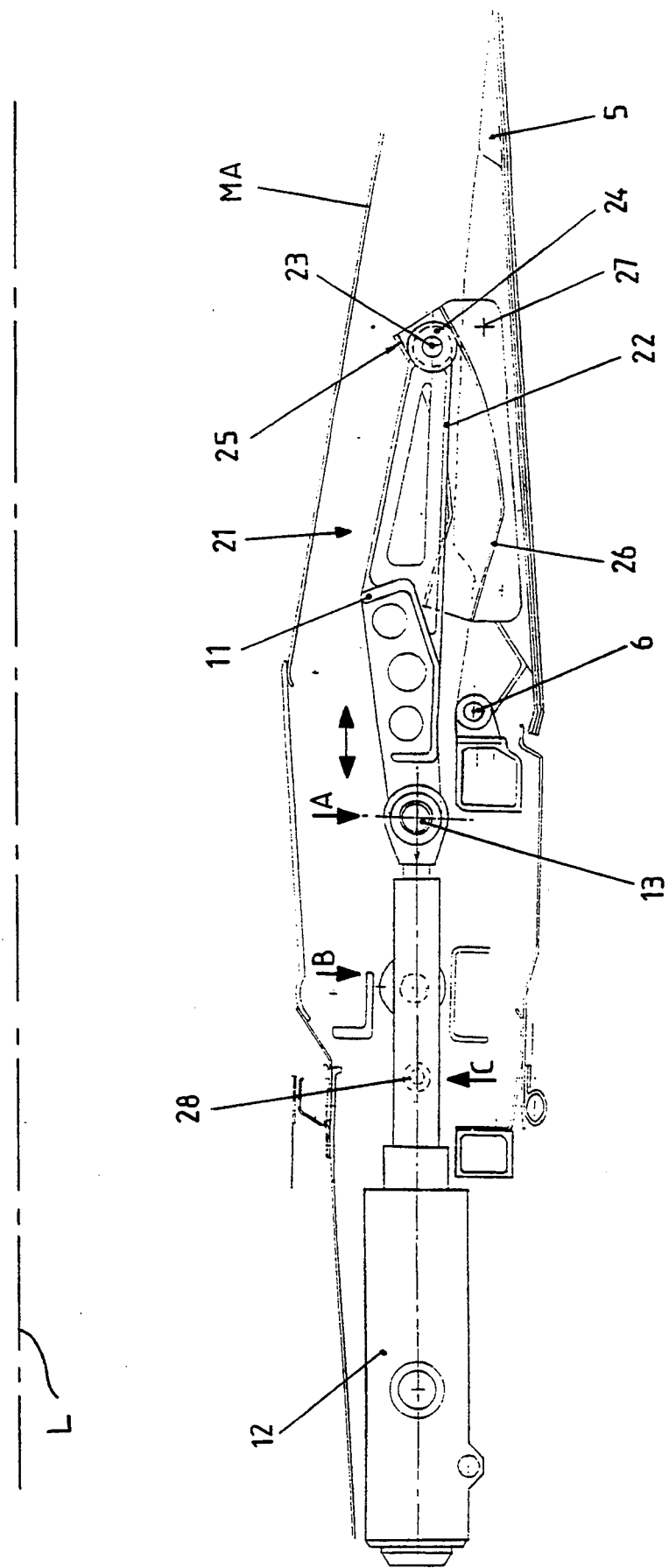
FIG. 2 is a partial, longitudinal, cross-sectional view taken along a plane extending along the longitudinal axis and circumferentially displaced from the cross-section illustrated in FIG. 1.

The variable geometry exhaust nozzle according to the present invention is illustrated in FIGS. 1 and 2 and comprises a main annular structure 2 which encloses a nozzle collar 3 situated immediately downstream of an outer annular wall which defines the gas flow duct at the turbojet engine exit. The main structure 2 and the nozzle collar 3 comprise stationary portions of the turbojet engine.

An annular cowling support 4 is connected to the main structure 2 such that the cowling support is spaced radially outwardly from and downstream of the main structure 2. Outer or cold flaps 5 define an annular structure extending around longitudinal axis L and the flaps are pivotally attached to the cowling support 4 by pivot shafts 6. As can best be seen in FIG. 2, the pivot shafts 6 are located adjacent to an upstream edge of outer flap 5. It is to be understood that gases from the turbojet engine pass from an upstream direction (towards the left in FIGS. 1 and 2) to a downstream direction (towards the right as illustrated in FIGS. 1 and 2).

An inner flap ring, disposed radially inwardly of outer flaps 5 towards the longitudinal axis L comprises a set of upstream flaps 7 and a set of downstream flaps 8 wherein the upstream edges of the upstream flaps 7 are pivotally attached by shafts 9 to the main annular structure 2. Pivot shaft 10 pivotally connects the downstream edges of the flaps 7 to a corresponding upstream edge of the downstream flaps 8. In known fashion, the outer set of flaps 5, the inner, upstream set of flaps 7 and the inner, downstream set of flaps 8 may each comprise a plurality of controlled flaps arranged in an annular array around longitudinal axis L having sets of follower flaps disposed circumferentially between the controlled flaps. The description of the reference numerals 5, 7 and 8 relate to the controlled flaps of each flap set.

A control ring 11 is located in the annular space bounded by the inner and outer flap sets and is movable in an axial direction generally parallel to longitudinal axis L by a plurality of control members 12 connected between the stationary portion of the turbojet engine and the control ring 11. The control members 12 may comprise actuating cylinders having an extendible and retractable rod 28 connected to control ring 11 via hinge 13.

Control ring 11 is pivotally connected to upstream flaps 7 via first link rod 14 by pivots 15 and 16, respectively. The controlled downstream flaps 8 have a second link rod 18 pivotally connected at 19 adjacent to their downstream edges, the second link rod 18 also being pivotally connected to the cowling support 4 via pivot connection 20.

Controlled outer flaps 5 are connected to control ring 11 by means of a cam structure 21. One or more arms 22 extend axially downstream from the control ring 11 and have cam roller 24 pivotally attached to a downstream end via pivot 23. Cam surfaces 25 and 26 are fixedly attached to an inner rib 27 which, in turn, is attached to the outer flap 5. Thus, axial movement of the control ring 11 will also cause movement of outer flaps 5.

FIG. 1 illustrates the inner flaps 7 and 8 arranged in a converging-diverging configuration. As illustrated in solid lines, the nozzle cross-section is relatively large and a control ring 11 is located in a plane extending generally perpendicular to the longitudinal axis L to the rear or downstream of a corresponding radial plane passing through pivots 16 which attach the first link rod 14 to the inner upstream flaps 7. Thus, the first link rods 14 assume a position slightly inclined with respect to the longitudinal axis L. The second link rods 18 are generally horizontal, but are, again, slightly inclined with respect to the longitudinal axis L. In this position of the control ring 11, the rod 28 of the actuating cylinders 12 is extended its maximum amount. When the rods 28 are retracted towards the actuating cylinder 12, the control ring 11 moves forward, or upstream, in a direction substantially parallel to longitudinal axis L. Such movement causes the first link rods 14 to pivot the upstream flaps 7 in a clockwise manner (as illustrated in FIG. 1) about pivot axis 9, thereby reducing the cross-sectional area of the nozzle. The controlled downstream flaps 8 follow the motion of the upstream flaps 7 while remaining substantially mutually parallel. The inner sets of flaps may assume a plurality of converging-diverging configurations ranging from a maximum open position MA, illustrated in solid lines in FIG. 1, through positions α, β to a minimum open position Mi shown in dashed lines in FIG. 1, depending upon the actuation of the control members 12.

When the control ring 11 moves forward or upstream, the cam rollers 24 bear against cam guide surface 25 such that the cold flaps 5 are rotated about hinge 6 affixed to the cowling support and are, hence, closed when the inner flap sets are in position Mi.

In FIG. 1, the reference numeral 30 denotes second control members which may implement the axial translation of the cowling support 4 in a direction substantially parallel to the longitudinal axis L. During the above described movement of the inner flaps while in their converging-diverging configuration, the cowling support 4 remains stationary. In order to alter the nozzle configuration to a converging-converging configuration (γ), the cowling support 4 is axially moved. Control members 30 move the support 4 from an extreme forward or upstream position into an extreme rear, or downstream, position. The position of link rod 18 when the cowling support 4 is in its extreme rear or downstream position is illustrated at 18'.

The cowling support 4 is axially guided by rollers 31 attached to the main nozzle structure 2. Rollers 31 bear against rails 32 which extend forward from the cowling support 4 and which are connected to movable ends 34 of the second control member 30 by arms 33.

When moving towards the rear or downstream position, the cowling support 4 also causes the cold flaps 5 to move toward the rear, or downstream. The cam surfaces 25 and 26 are shaped such that this rearward motion of the outer flaps 5 will be a translational movement. During this displacement, the outer flaps 5 are in their closed positions and the segments of the cam guides 25 and 26 engaging cam rollers 24 in that case are parallel to the longitudinal axis L.

The control members 12 and 30 may comprise hydraulic or pneumatic actuating cylinders or screws, or any other known device capable of applying a reversible force to the control ring 11 and the cowling support 4.

Two operating modes can be achieved using a single control loop for the rod positions of the first control members 12 in conjunction with a go/no-go control actuating or cancelling the transmission of a command from the control loop of the first control members 12 to the second control members 30. If the operational mode is converging-diverging, the cowling support 4 is stationary in its forwardmost, or upstream position wherein the rods of the second control members 30 are retracted. Thus, the inner, downstream flaps 8 define a diverging cross-section. In this instance, only the first control members 12 are operative and act on the control ring 11 and the first link rods 14 to adjust the nozzle cross-section by moving the flaps such that the nozzle remains in a converging-diverging configuration.

If the operating mode is to be converging-converging, the cowling support 4 is no longer stationary. The cowling support 4 is moved simultaneously with the control ring 11, but in opposite axial directions in order to avoid locking the upstream flaps 7 and downstream flaps 8 about the pivot 10.

The displacement command transmitted to the second control members 30 is the same as that transmitted to the first control members 12, but multiplied by a negative factor K. This go/no-go command with its multiplying factor may be implemented in various known ways, such as by hydraulic or electronic means. The control system utilized with the present invention is more economical than the known control systems which utilize two control loops, one for each set of control members.

Figure 3:
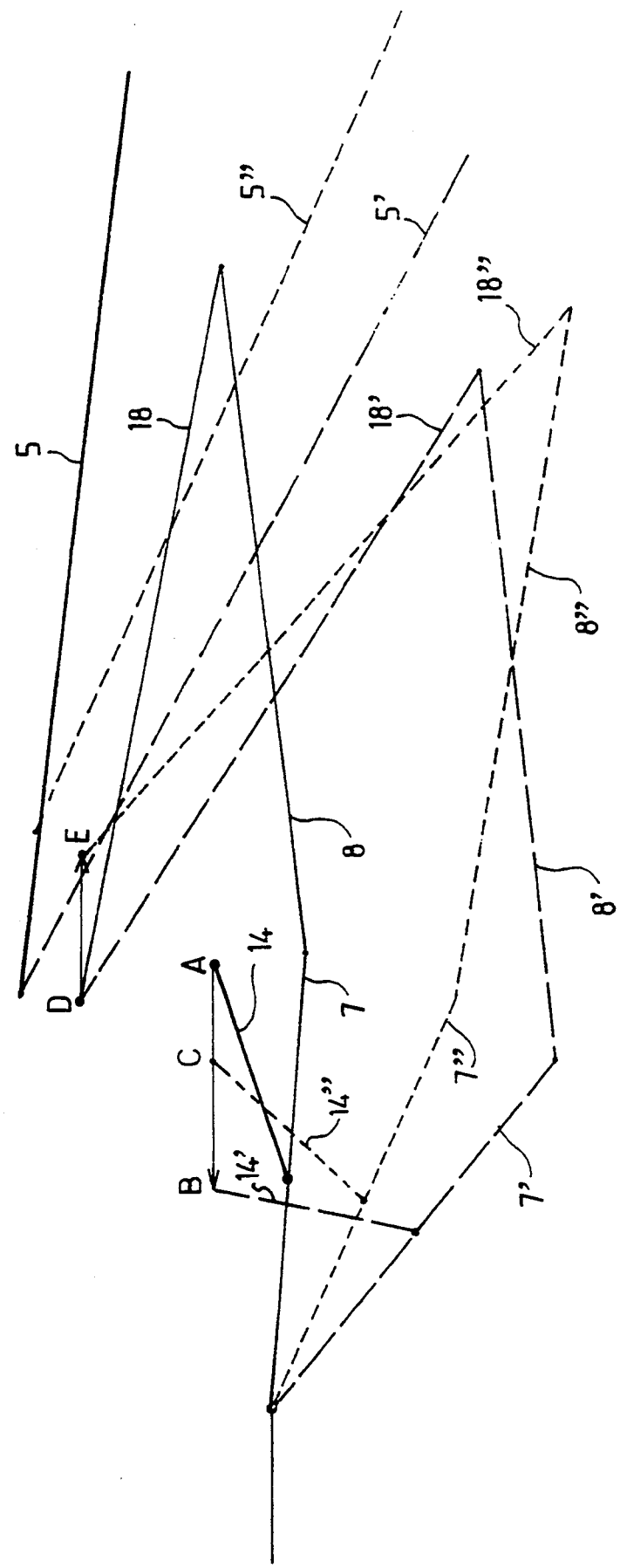
FIG. 3 is a schematic diagram illustrating the various positions of the controllable flaps in the nozzle according to the present invention.

FIG. 3 schematically illustrates the various positions of the flaps 5, 7 and 8. When the nozzle is in a converging-diverging configuration and at maximum opening, the control ring 11 is located at its most rearward or downstream position A. As the control ring moves from downstream position A towards upstream position B the flaps assume the positions shown in dashed lines and are illustrated by references 5', 7' and 8'. When the control ring 11 reaches its forwardmost, or upstream position B, the nozzle cross-section will be at a minimum in the converging-diverging mode.

In this configuration, the nozzle may be converted to a converging-converging configuration by movement of the control ring 11 downstream from position B to position C while the cowling support 4 simultaneously moves from position D to position E. The cross-sectional area is at a minimum when the flaps assume the positions illustrated at 5'', 7'' and 8''. When the control ring 11 is in position B, the first link rods 14 are oriented approximately 5° from a vertical position.

Figure 4:
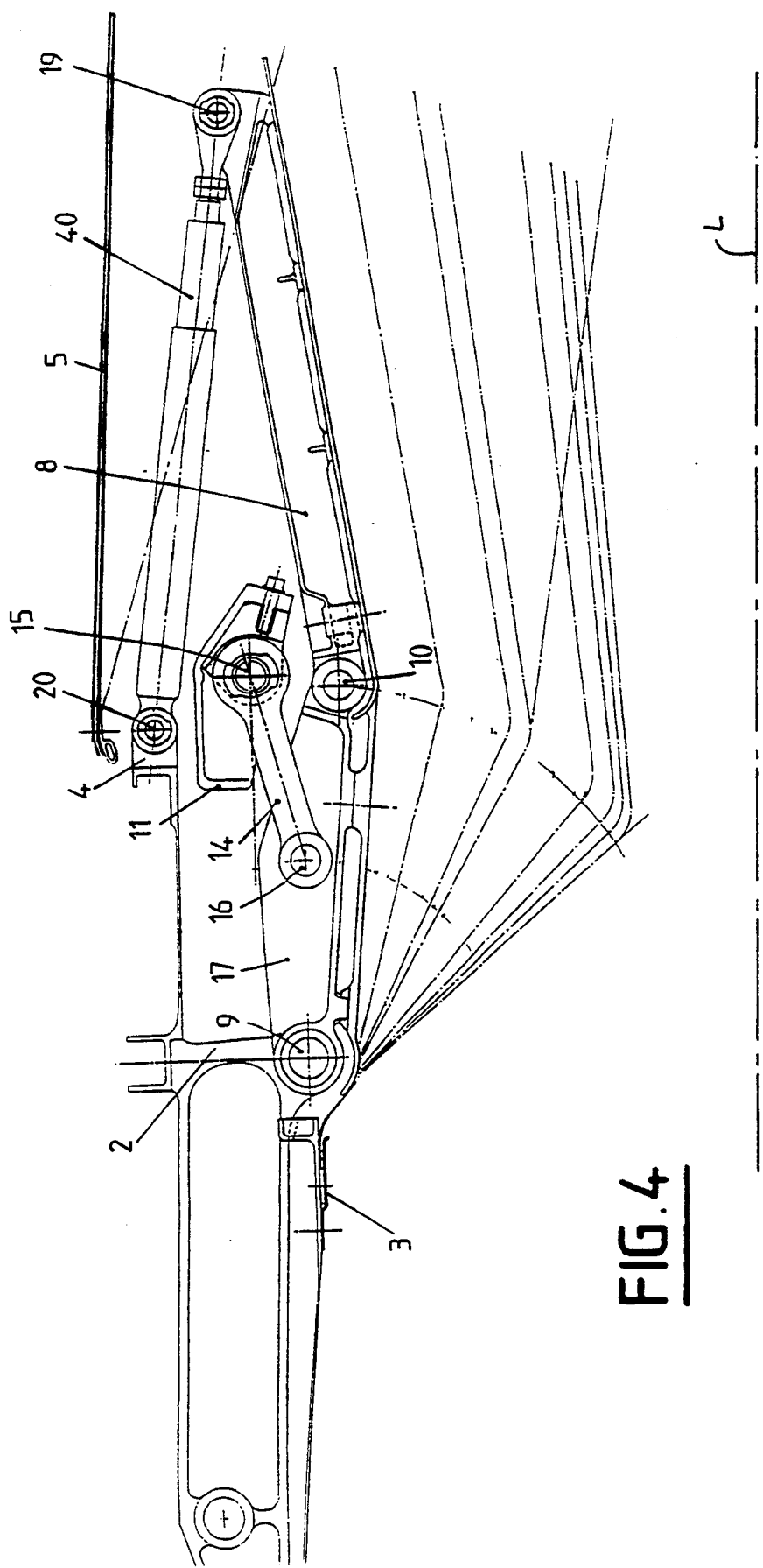
FIG. 4 is a partial, longitudinal, cross-sectional view similar to FIG. 1, illustrating an alternative embodiment of the nozzle according to the present invention.

An alternative embodiment is illustrated in FIG. 4 in which the cowling support 4 is stationary and the second link rods 18 are replaced by third control members 40. The control members 40, which may also comprise actuating cylinders having extendible and retractable rods, are controlled in a go/no-go manner as were control members 30, to pass from the converging-diverging configuration to the converging-converging configuration.

The foregoing description is provided for illustrative purposes only and should not be construed as in any way limiting this invention, the scope of which is defined solely by the appended claims.

We claim:

1. A variable geometry nozzle for a turbojet engine having an exhaust duct extending about a longitudinal axis and having a downstream end portion, the nozzle comprising:
    a) a set of inner upstream flaps each having an upstream edge portion pivotally attached to the downstream end portion of the turbojet engine and further having a downstream edge;
    b) a set of inner downstream flaps each having an upstream edge pivotally attached to the downstream edge of an inner upstream flap and further having a downstream edge;
    c) a cowling support attached to and spaced from the downstream edge of the turbojet engine so as to be movable in a direction generally parallel to the longitudinal axis between upstream and downstream positions;
    d) a set of outer flaps pivotally attached to the cowling support;
    e) a control ring movable in a direction generally parallel to the longitudinal axis between a forwardmost position and a rearwardmost position;
    f) first actuating means connected to the control ring to move the control ring between its forwardmost and rearwardmost positions;
    g) first link rods connecting the control ring to the set of inner upstream flaps;
    h) means connecting the cowling support to the set of inner, downstream flaps;
    i) cam means interconnecting the set of outer flaps to the control ring; and,
    j) second actuating means connected to the cowling support so as to move the cowling support between the upstream and downstream positions whereby, in a converging-diverging configuration the cowling support is stationary such that the nozzle geometry is controlled solely by the first actuating means, and whereby, in a converging-diverging configuration the nozzle geometry is controlled by simultaneous actuation of the first and second actuating means.

2. The variable geometry nozzle of claim 1 wherein the cam means is shaped such that in a converging-converging configuration, the set of outer flaps axially translates with the cowling support.

3. The variable geometry nozzle of claim 1 wherein the means connecting the cowling support to the downstream flaps comprises a second link rod.

4. The variable geometry nozzle of claim 1 wherein the first actuating means comprise at least one first actuating cylinder with an extendible and retractable rod.

5. The variable geometry nozzle of claim 4 wherein the second actuating means comprises at least one second actuating cylinder with an extendible and retractable rod.

6. A variable geometry nozzle for a turbojet engine having an exhaust duct extending about a longitudinal axis and having a downstream end portion, the nozzle comprising:
   a) a set of inner upstream flaps each having an upstream edge portion pivotally attached to the downstream end portion of the turbojet engine and further having a downstream edge;
   b) a set of inner downstream flaps each having an upstream edge pivotally attached to the downstream edge of an inner upstream flap and further having a downstream edge;
   c) a cowling support attached to and spaced from the downstream edge of the turbojet engine;
   d) a set of outer flaps pivotally attached to the cowling support;
   e) a control ring movable in a direction generally parallel to the longitudinal axis between a forwardmost position and a rearwardmost position;
   f) first actuating means connected to the control ring to move the control ring between its forwardmost and rearwardmost positions;
   g) first link rods connecting the control ring to the set of inner upstream flaps;
   h) actuating cylinder means having an extendible and retractable rod connecting the cowling support to the set of inner, downstream flaps; and,
   i) cam means interconnecting the set of outer flaps to the control ring.

7. The variable geometry nozzle of claim 6 wherein the first actuating means comprises at least one actuating cylinder with an extendible and retractable rod.

* * * * *